Patented May 23, 1933

1,910,440

UNITED STATES PATENT OFFICE

LEON LILIENFELD, OF VIENNA, AUSTRIA

ARTIFICIAL MATERIALS AND PROCESS FOR MAKING SAME

No Drawing. Application filed March 7, 1931, Serial No. 521,018, and in Great Britain March 15, 1930.

The present process is a further development of the invention described in my application Ser. No. 435,648.

In continuing my researches based on my specification Ser. No. 435,648, I have found that artificial materials having similar properties are obtained if the xanthates of the oxy-(hydroxy-)alkyl derivatives of cellulose are prepared from such oxy-(hydroxy-)alkyl derivatives of cellulose as are produced by means of cyclic ethers of di- or poly-hydric alcohols.

The oxy-(hydroxy-)alkyl derivatives of cellulose to be xanthated may be prepared according to any suitable process or method by acting, in presence or absence of an alkali or of a catalyzer, with one or more cyclic ethers (such as alkylene oxides or suitable cyclic ethers of tri- or tetra-hydric alcohols, for example glycide (epihydrine alcohol) or butadiene dioxide) on cellulose.

The xanthates of the oxy-(hydroxy-)alkyl derivatives of cellulose of the aforementioned type may be prepared according to any suitable process or method of xanthating cellulose or cellulosic bodies in general and of oxy-(hydroxy-)alkyl derivatives of cellulose in particular, for example by methods analogous to the processes and methods described in my copending application Ser. No. 435,647

The xanthates of the oxy-(hydroxy-) alkyl derivatives of cellulose of the aforementioned type may be worked up into artificial materials, for instance threads, alone or in conjunction with other colloids, such as cellulose xanthate. Such combination with cellulose xanthate can be effected by mixing a solution of a xanthate of an oxy-(hydroxy-)alkyl derivative of cellulose of the aforementioned type with viscose, or by dissolving cellulose xanthate (sulphidized alkali cellulose) in a solution of a xanthate of an oxy-(hydroxy-) alkyl derivative of cellulose of the aforementioned type, or by dissolving a xanthate of an oxy-(hydroxy-)alkyl derivative of cellulose of the aforementioned type in viscose, or by conducting the present process so that the carbon bisulphide is allowed to act in presence of caustic alkali upon a mixture of an oxy-(hydroxy-)alkyl derivative of cellulose of the aforementioned type and cellulose, for example by treating cellulose in presence or absence of alkali (when alkali cellulose is used as starting material, the alkali contained therein can be employed for this purpose) with one or more cyclic ethers of di- or polyhydric alcohols under such conditions that only part of the cellulose is converted into the corresponding ether of cellulose and thereafter, by acting upon with carbon bisulphide in the presence of an alkali, converting the thus obtained reaction mass into a mixture of a xanthate of the corresponding oxy-(hydroxy-) alkyl ether of cellulose with cellulose xanthate. This can then be dissolved in a solution of an alkali. Also alkali-soluble derivatives of cellulose other than cellulose xanthates or alkali-soluble cellulose hydrates or proteins or gelatine may be added to and mixed with the xanthates of the cellulose ethers.

Any suitable softening agents, such as glycerine or a glycol or a sugar, such as glucose, or a soap, or Turkey-red oil, or a drying or non-drying oil, or any agents imparting elasticity, for example a halogen derivative of a di- or a polyvalent alcohol, particularly a halohydrine, such as a dichlorohydrine or a monochlorohydrine or ethylene chlorohydrine may be added to the solutions of the xanthates.

Since the practice of the process is exactly as set forth in the aforesaid specification Ser. No. 435,648 and explained therein by aid of numerous examples, it appears unnecessary to repeat here all particulars relating to the carrying out of the present process under various working conditions and to give here examples demonstrating all possible modifications of executing the present invention. In conjunction with the detailed description and the examples of specification Ser. No. 435,648, the following examples appear to be sufficient to illustrate the practical execution of the invention which however is by no way limited to these examples.

Example I 1000 parts of wood-pulp (moisture 9 to 10 per cent.) or 1000 parts of cotton linters (moisture 7 to 8 per cent.) are steeped in 20,000 parts of caustic soda solution of 18 per cent. strength at 15° C. and the thus obtained mass is allowed to stand for 3 hours at room temperature. After this time the alkali cellulose is pressed down to 3400 parts and comminuted in a shredder for 3 hours at 12 to 13° C., whereupon the alkali cellulose is cooled down to 0° C., 200 to 300 parts of precooled ethylene oxide are added to the cooled alkali cellulose and the thus obtained reaction mass kneaded at 15° C. in a hermetically closed shredding machine, whereupon it is kept for 20 hours at room temperature.

The reaction mass is now placed in a filter press or on a straining cloth and washed with water until free from alkali, whereupon it is pressed down to about three to four times the weight of the parent cellulose. The water content of the pressed product is determined by drying a sample at 105° C.

The mass is now (at 15° C.) well mixed with such an amount of water and caustic soda as to give 20,000 parts of a caustic soda solution of 18 per cent. strength. (The water present in the mass is taken into account in figuring the amount of water to be added.)

The reaction mixture is now allowed to remain at room temperature for 3 hours, whereupon it is pressed down to 3400 to 4500 parts and comminuted in a shredder for 3 hours at 12 to 13°. Immediately after shredding, 600 parts of carbon bisulphide are added, and the reaction mass placed in a closed vessel and kept therein for 10 hours at 19° C. The excess carbon bisulphide is then blown off during 15 minutes, and the xanthated mass dissolved in water and caustic soda, for example so as to yield a solution containing about 5 to 7 per cent. of the dry residue of the washed and pressed mass after the ethylene oxide reaction, and 8 per cent. of caustic soda.

The thus obtained solution is aged for 96 hours at 15° C., during which time it is filtered twice to three times through medicated cotton wool. The aged solution is spun into a bath of $H_2SO_4$ of at least 35% or into a solution of another mineral acid of equivalent strength, or is spun into any of the commonly used coagulating baths of the viscose industry and then treated in the strong acid bath. Many modifications of the spinning operation are described in my parent application 435,648.

Example II 1000 parts of wood-pulp (moisture 9 to 10 per cent.) or 1000 parts of cotton linters (moisture 7 to 8 per cent.) are steeped in 20,000 parts of caustic soda solution of 18 per cent. strength at 15° C., and the thus obtained mass is allowed to stand for 3 hours at room temperature. After this time the alkali cellulose is pressed down to 3400 parts and comminuted in a shredder for 3 hours at 12 to 13° C. The alkali cellulose is cooled down to 0° C. To the cooled alkali cellulose 1000 parts of pre-cooled ethylene oxide are added, and the thus obtained reaction mass kneaded at 15° C. in a hermetically closed shredding machine, whereupon it is kept for 20 hours at room tempeerature.

The mass which is readily soluble in dilute caustic soda solution is placed in a filter press or on a straining cloth and washed with water until free from alkali, whereupon it is pressed and, after its water-content has been determined, dissolved in such an amount of caustic soda and water as to yield a solution containing 7 per cent. of precipitable cellulosic substance and 8 per cent. of NaOH.

To this solution 1000 parts of carbon bisulphide (calculated on the weight of the dry residue of the washed and pressed mass) are added, and the reaction mixture kept (with shaking) for 10 to 20 hours at room temperature. The thus obtained clear solution is allowed to age for 24 to 48 or 96 hours, during which time it is filtered twice or three times through cotton wool. The aged solution is spun in a similar manner as described under Example I or in the examples of the specification Ser. No. 435,648.

Example III 1000 parts of wood-pulp (moisture 9 to 10 per cent.) or 1000 parts of cotton linters (moisture 7 to 8 per cent.) are steeped in 20,000 parts of caustic soda solution of 50 per cent. strength at 15° C. and the thus obtained mass is allowed to stand for 3 hours at room temperature. After this time the alkali cellulose is pressed down to 4000 parts and comminuted in a shredder for 3 hours at 11° C., whereupon the alkali cellulose is cooled down to 0° C. A quantity of precooled, therefore liquid ethylene oxide sufficient to cover the alkali cellulose is added to the alkali cellulose which is cooled with ice and the reaction mixture under continual cooling kept at 1° C. for 4 hours.

The mass is placed in a filter press or on a straining cloth and washed with water until free from alkali, whereupon it is pressed and, after its water content has been determined, dissolved in such an amount of caustic soda and water as to yield a solution containing 7 per cent. of precipitable cellulosic substance and 8 per cent. of NaOH.

To this solution 1000 parts of carbon bisulphide (calculated on the weight of the dry residue of the washed and pressed mass) are added, and the reaction mixture kept (with shaking) for 10 to 20 hours at room temperature. The thus obtained clear solution is allowed to age for 24 to 48 or 96 hours during which time it is filtered twice or three times through cotton wool. The aged solution is spun in a similar manner as described in Example I or in the examples of the specification Ser. No. 435,648.

Example IV 1000 parts of finely divided wood-pulp or cotton linters are placed in a rotating autoclave, whereupon 1200 parts of ethylene oxide, which have been cooled down to 0° C., are added, the mixture heated to 95 to 100° C. and kept at that temperature for 8 to 10 hours. After that time the autoclave is cooled down and the reaction mixture placed in a filter press or on a straining cloth and washed with water. The washed product is then freed from the excess of water by pressing, whereupon the water-content in the pressed mass is determined and the mass converted into its xanthate and the latter dissolved in the manner described in Example I. The thus obtained xanthate is spun in a manner similar to the methods described in the examples of the specification Ser. No. 435,648.

Example V

The process is conducted as in Example IV, but with the difference that, before the heating step, 1200 to 3000 parts of di-methyl-aniline are added and kneaded into the mixture of cellulose and ethylene oxide while being cooled, the mixture allowed to stand in a well-closed vessel for 24 to 48 hours at room temperature, and then heated in a rotating autoclave as described in Example IV.

Example VI

Mode of procedure as in Example IV, but with the difference that, instead of 1200 parts, 10.000 parts of ethylene oxide are employed.

Example VII

Into 1000 parts of finely divided wood-pulp or cotton linters, 6000 to 10.000 parts of di-methyl-aniline are kneaded, e: g. at room temperature until the mixture is homogenous. Thereupon 6000 to 10.000 parts of ethylene oxide are added and the mass kept in a well-closed vessel for 24 to 48 hours at room temperature. After that time the reaction mixture is slightly acidified with dilute sulphuric acid under stirring and washed until free from sulphuric acid. Thereafter the washed product is pressed and its water content determined. The washed and pressed product is then converted into its xanthate and the xanthate dissolved as in Example I and spun in a manner similar to the methods described in the examples of the specification Ser. No. 435,648.

Example VIII

Into 1000 parts of finely divided wood-pulp or cotton linters, 1000 to 5000 parts of di-methyl-aniline are kneaded, until the mixture is homogeneous. Thereupon 5000 parts of ethylene oxide are added and the mass kept in a well-closed vessel for 24 to 48 hours at room temperature. After that time the reaction mixture is heated in a rotating autoclave for 8 hours at 100° C. and then converted into its xanthate and the latter dissolved as in Example I and spun in a manner similar to the methods described in the examples of the specification Ser. No. 435,648.

Example IX 1000 parts of wood-pulp or cotton linters are placed in a rotating autoclave, whereupon 600 parts of pre-cooled ethylene oxide are added and the reaction mixture heated for 3 to 4 hours at 50° C. After that time the reaction mass is removed from the autoclave, thoroughly washed with water or alcohol and then water, pressed, xanthated and dissolved in the manner described in Example I. The thus obtained solution is spun in a manner similar to the methods described in the examples of the specification Ser. No. 435,648.

Example X

Mode of procedure as in Example IX, but with the difference that the treatment of the cellulose with the ethylene oxide is effected at room temperature.

Example XI

The process is conducted as in Example IX or X, but with the exception that, instead of 600 parts, 300 to 400 parts of ethylene oxide are employed.

Example XII

Mode of procedure as in Example IX, but with the difference that, besides the ethylene oxide, 50 to 80 parts of di-ethyl-aniline are incorporated with the cellulose before the heating step.

Example XIII

The process is conducted as in any one of the preceding examples, but with the difference that, instead of the ethylene oxide, an equimolecular proportion of propylene oxide or glycide is employed.

Example XIV

The process is conducted as in Example I, but with the difference that, after the ethylene oxide reaction step, the reaction mass is, without being washed, acted upon with 600 parts of carbon bisulphide for 10 hours at 20° C. The resultant mass is dissolved in such a quantity of water and caustic soda as to yield a solution containing about 6 to 7 per cent. of precipitable cellulosic substance and 8 per cent. of NaOH.

The filtered solution, after having aged for 48 hours at 15° C., is spun in a manner described in the examples of the specification Ser. No. 435,648.

Example XV

The process is conducted as in any one of the preceding examples, but with the difference that the cellulose ether xanthate is dissolved in so much water and caustic alkali as to yield a solution containing about 3 per cent. of precipitable cellulosic substance and 5 per cent. of NaOH.

For the carrying out of this example it is recommended to start with a cellulose of high viscosity (determined by the customary methods).

Example XVI

The process is conducted as in Example I or II, but with the exception that the alkali cellulose is allowed to mature for 48 to 60 hours at 15 or 20° C.

In all of the foregoing examples the action of the acid may be interrupted also by subjecting the threads leaving the bath consisting of, or containing strong acids, to a low temperature, for instance $-5$ to $-15°$ C., before it is washed which, for instance, may be done by collecting it on a hollow spool containing a cooling agent, for instance solid carbonic acid, or a freezing mixture, or ice.

Example XVII

Mode of procedure as in any one of the preceding examples, but with the difference that to the spinning solution 10 to 30 parts of α-dichlorohydrine or α-monochlorohydrine or ethylene chlorohydrine to 100 parts of the cellulosic substance contained therein, are added after the dissolving step.

The manufacture of staple fibre will be entirely clear from the foregoing examples.

After the threads have been washed, they may be heated or steamed at high temperature (for instance 100° to 110° C.) before or after the drying process.

Any desulphurization or bleaching of the threads may be conducted in the known manner.

The threads may also be desulphurized according to the process described in my specification Ser. No. 464,426, namely by treating them with a hot 10% solution of $Na_2S \cdot 9H_2O$ for 5 minutes or for 1 hour, or with a 30% solution of $Na_2S \cdot 9H_2O$ for about 5 to 10 minutes.

Example XVIII

A spinning solution, produced in the manner described in any one of the foregoing examples is introduced in the known manner into one of the precipitating and plasticizing liquids mentioned in Example I or in the examples of specification Ser. No. 435,648 through a suitable hopper or slit, and the coagulated film band, after having been run through this bath, is washed in the known manner and dried.

Example XIX

A cotton textile material such as a cotton fabric is impregnated or filled, or coated one or several times, in a suitable machine, for instance a padding machine or a backfilling machine, or a spreading machine, with a solution produced in the manner described in any one of the foregoing examples, to which solution a filling material such as talc or china clay or zinc white (for instance 100 to 200 per cent. calculated on the weight of the precipitable cellulosic substance) or a dyestuff or a pigment, such as mica, or lampblack, may be added and without being dried, if necessary in a state of tension, is passed through a bath having the composition of one of the coagulating liquids mentioned in Example I or in the examples of specification Ser. No. 435,648. The impregnated or coated textile material is then washed and dried.

In the foregoing examples in making the ethers of cellulose a small amount of an inorganic catalyzer, such as a copper salt or nickel salt or silver salt or iron salt or the like may be incorporated with the reaction mixture.

As to whether or not the alkali cellulose is to be first matured, before treatment with the oxyalkylating agent, if the cellulose to be used in a particular case would, without maturing, give the desired viscosity, then maturing is unnecessary. If however the particular cellulose to be used would, without maturing, give too high a viscosity, then maturing of the alkali cellulose is advisable.

If it is desired to give the solution a definite viscosity, then the alkali cellulose produced from the kind of cellulose contemplated is subjected to a maturing process, if without maturing this kind of cellulose yields a higher viscosity. If, however, it exhibits from the first the desired degree of viscosity, that is without maturing, the maturing is unnecessary. Now, as the viscosities of the different kinds of cellulose on the market (linters and wood-pulp) differ very much from one another, the question of maturing depends in most cases on the one hand on the viscosity desired of the initial solution intended for the manufacture of artificial material, and on the other hand on the viscosity of the kind of cellulose being worked.

In the specification and claims, wherever the context permits, the expression "cellulose" includes the near conversion products and oxidation products of cellulose, such as cellulose hydrate, hydrocellulose and oxycellulose.

Although, according to general practice, the terms "oxy" covers also "hydroxy", to avoid any misunderstanding, it is pointed out that in the specification and claims the term "oxy" is intended to cover "hydroxy" also.

The alcohols containing two or more than two OH groups are hereinafter embraced in the term "polyhydric alcohols" including ethylene glycol.

All other particulars relating to the carrying out of the process as well as the principal modifications of the same, for example the various kinds of cellulose that may be used, instead of wood-pulp or cotton linters, the various plasticizing agents which can be used in lieu of strong sulphuric acid are described in the specification Ser. No. 435,648 and in my specification Ser. No. 435,649.

The expressions "viscose", "artificial materials", "artificial threads", "strong mineral acid", "strong sulphuric acid" used in this specification, have the same meaning as they have in the specification Ser. No. 435,648 and in my specification Ser. No. 435,649.

As examples of other plasticizing agents which can be used in place of sulphuric acid of at least 35%, I may mention the following liquids (mentioned in the cases noted in the last paragraph) :—

Hydrochloric acid of about 40–42% strength,

Sulphuric acid of about 35% or stronger, containing also about 10% to about 13.3% of ammonium sulphate, Nitric acid of about 60 to 90% $HNO_3$, Phosphoric acid of about 1.5 to 1.86 s. g. (about 67.5 to 99% $H_3PO_4$), Arsenic acid of about 60 to 90% $H_3AsO_4$, Zinc chloride solution of about 60% strength (which may if desired, also contain about 4 to 6% HCl).

The above solutions are given as typical examples of plasticizing baths, as used herein, but the invention is not restricted to the employment of these specific solutions.

What I claim is:—

1. A process of producing a xanthated cellulosic material which comprises acting upon cellulose with a cyclic ether of a polyhydric alcohol, and reacting upon the resulting body with carbon bisulfid and alkali, whereby an alkali-soluble xanthate of a cellulose ether is produced, dissolving same in an alkaline aqueous solution and converting same into an artificial material and plasticizing the latter at some stage after the commencement of the regeneration step.

2. A process of making an artificial material which comprises bringing a solution containing a xanthate of an oxy-alkyl derivative of cellulose prepared by acting upon cellulose with a cyclic ether of a polyhydric alcohol into the form of an artificial material, and coagulating and plasticizing such product.

3. A process as covered in claim 2, wherein a solution of a xanthate of an oxyalkyl derivative of cellulose prepared by acting upon cellulose with a cyclic ether of a polyhydric alcohol in the form of an artificial material is acted upon with an agent which has a coagulating effect on the shaped solution and which also has a plasticizing effect on the freshly coagulated artificial material.

4. A process as covered in claim 2, wherein a solution of a xanthate of an oxyalkyl cellulose prepared by acting upon cellulose with a cyclic ether of a polyhydric alcohol, in the form of an artificial material is acted upon first with an agent which has a coagulating effect on the shaped solution and then with an agent which has a plasticizing effect on the freshly coagulated artificial material.

5. A process as covered in claim 2, wherein a preshaped solution of a xanthate of an oxyalkyl cellulose prepared by acting upon cellulose with a cyclic ether of a polyhydric alcohol is caused to enter directly into a coagulating bath which has also a plasticizing action on the coagulated artificial material.

6. A process as in claim 2, wherein the coagulating and plasticizing actions are effected in the bath of sulfuric acid of not below 35% strength.

7. A process as in claim 2, in which the coagulating and plasticizing actions are effected in sulfuric acid of at least 45% strength.

8. A process which comprises treating a solution containing a xanthate of an oxyalkyl derivative of cellulose prepared by acting upon cellulose with a cyclic ether of a polyhydric alcohol, having the form of an artificial material, with a coagulating agent and thereafter with a bath containing a mineral acid equivalent to sulfuric acid of at least 35% strength.

In testimony whereof I affix my signature.

LEON LILIENFELD.